United States Patent
Hiramoto et al.

(10) Patent No.: US 10,247,623 B2
(45) Date of Patent: Apr. 2, 2019

(54) IN-TANK VALVE

(71) Applicants: KEIHIN CORPORATION, Tokyo (JP); HONDA MOTOR CO., LTD., Tokyo (JP)

(72) Inventors: Hideto Hiramoto, Sakura (JP); Hideki Kawauchi, Nikko (JP); Narihiro Takagi, Tochigi-ken (JP); Koichi Takaku, Tochigi-ken (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 384 days.

(21) Appl. No.: 15/079,778

(22) Filed: Mar. 24, 2016

(65) Prior Publication Data
US 2016/0282200 A1    Sep. 29, 2016

(30) Foreign Application Priority Data
Mar. 27, 2015  (JP) .................................. 2015-066457

(51) Int. Cl.
*G01K 13/00* (2006.01)
*G01K 1/14* (2006.01)
*G01K 1/16* (2006.01)

(52) U.S. Cl.
CPC ............... *G01K 13/00* (2013.01); *G01K 1/14* (2013.01); *G01K 1/16* (2013.01);
(Continued)

(58) Field of Classification Search
None
See application file for complete search history.

(56) References Cited

U.S. PATENT DOCUMENTS

| 3,438,664 A | 4/1969 | Meyer |
| 6,227,785 B1 | 5/2001 | Kilgore |

(Continued)

FOREIGN PATENT DOCUMENTS

| JP | 2009144831 A | * | 7/2009 |
| JP | 2012097815 A | * | 5/2012 |

(Continued)

OTHER PUBLICATIONS

This application is co-pending U.S. Appl. No. 15/079792, which was filed in the United States Patent and Trademark Office on Mar. 24, 2016.

(Continued)

*Primary Examiner* — Clayton E. LaBalle
*Assistant Examiner* — Leon W Rhodes, Jr.
(74) *Attorney, Agent, or Firm* — Rankin, Hill & Clark LLP

(57) ABSTRACT

In an in-tank valve, a detector including a detecting sensor is disposed on an end of a body, and the detecting sensor is accommodated inside a sensor housing. Within the sensor housing, a sensor retaining member is formed in an interior part of an opened sensor accommodating section, and the detecting sensor is disposed therein so as to face toward a first communication hole of the sensor retaining member. Lead wires, which are connected to the detecting sensor, are led out to the exterior in a bending fashion from a wiring port, whereby entry of hydrogen gas to the side of the detecting sensor is prevented by suitably closing the wiring port.

4 Claims, 4 Drawing Sheets

(52) U.S. Cl.
CPC .............. *F17C 2205/0323* (2013.01); *F17C 2205/0391* (2013.01); *F17C 2221/012* (2013.01); *F17C 2223/0123* (2013.01); *F17C 2223/036* (2013.01); *F17C 2250/0439* (2013.01); *F17C 2250/0491* (2013.01); *F17C 2270/0168* (2013.01); *F17C 2270/0184* (2013.01); *G01K 2205/00* (2013.01); *Y02E 60/321* (2013.01)

(56) References Cited

U.S. PATENT DOCUMENTS

| | | | |
|---|---|---|---|
| 6,998,947 B2* | 2/2006 | Penn | F17O 3/085 |
| | | | 324/318 |
| 7,645,107 B2 | 1/2010 | Yoneoka | |
| 8,052,119 B2 | 11/2011 | Numazaki et al. | |
| 8,496,225 B2* | 7/2013 | Numazaki | F17O 13/04 |
| | | | 137/551 |
| 9,404,621 B2 | 8/2016 | Suzuki et al. | |
| 2008/0302336 A1 | 12/2008 | Fuerst et al. | |
| 2009/0288723 A1 | 11/2009 | Numazaki et al. | |
| 2010/0132168 A1 | 6/2010 | Coffland et al. | |
| 2013/0220276 A1 | 8/2013 | Nakamura et al. | |
| 2014/0174574 A1* | 6/2014 | Lhymn | F16K 31/42 |
| | | | 137/583 |

FOREIGN PATENT DOCUMENTS

| | | |
|---|---|---|
| JP | 5217625 | 3/2013 |
| JP | 2013-64440 | 4/2013 |

OTHER PUBLICATIONS

U.S. Office Action dated Jul. 3, 2017, from co-pending U.S. Appl. No. 15/079,792, filed Mar. 24, 2016, 13 pages.

Japanese Office Action dated Jan. 8, 2019, English translation included, 7 pages.

* cited by examiner

IN-TANK VALVE

CROSS-REFERENCE TO RELATED APPLICATION

This application is based upon and claims the benefit of priority from Japanese Patent Application No. 2015-066457 filed on Mar. 27, 2015, the contents of which are incorporated herein by reference.

BACKGROUND OF THE INVENTION

Field of the Invention

The present invention relates to an in-tank valve disposed in the interior of a tank for switching between filling of a high pressure gas into the tank and discharging the high pressure gas to the exterior.

Description of the Related Art

Heretofore, an in-tank valve has been disposed in a gas tank into which a gas is filled for switching between filling and discharging of the gas. For example, in the in-tank valve disclosed in Japanese Patent No. 5217625, a temperature sensor, which is capable of detecting the temperature of a hydrogen gas in the interior of the tank, is disposed on a distal end of a body that is inserted in an inner part of the tank. In addition, when hydrogen gas is filled in the tank or when hydrogen gas is discharged from the tank, a temperature change is detected by the temperature sensor.

SUMMARY OF THE INVENTION

For example, when hydrogen gas is filled in the interior of the tank, since an agitated state comes about due to the hydrogen gas inside the tank undergoing fluid movement, even if such flowing hydrogen gas is detected by the temperature sensor, the temperature of the hydrogen gas cannot be measured accurately.

A general object of the present invention is to provide an in-tank valve, which is capable of accurately measuring the temperature of a high pressure gas in the interior of a tank.

The present invention is characterized by an in-tank valve disposed in a tank in which a high pressure gas is stored in interior thereof, and including in the interior of the tank a detector configured to detect a temperature of the high pressure gas, the detector comprising a sensor configured to detect the temperature, wiring connected to the sensor, and a casing including a fixing member configured to fix the sensor in interior of the casing, at least part of the wiring being accommodated in the casing, wherein a wiring port is formed in an outer circumferential surface of the casing through which the wiring is taken out to exterior of the casing, and the wiring port opens in a direction that is inclined with respect to an axial direction of the sensor.

According to the present invention, in the detector, which is provided for detecting the temperature of a high pressure gas in the in-tank valve, at least a portion of a wiring that is connected to the sensor is accommodated in the interior of the casing in which the fixing member is included that fixes the sensor to the interior thereof. In addition, the wiring port, which opens in a direction that is inclined with respect to an axial direction of the sensor, is formed in an outer circumferential surface of the casing, and the wiring is taken out to the exterior through the wiring port.

Consequently, since the wiring that is connected to the sensor is taken out to the exterior in a bending fashion through the wiring port of the casing, which opens in a direction inclined with respect to the axial direction, the flowing high pressure gas is prevented from entering into the interior of the casing through the wiring port. As a result, high pressure gas that has entered by flowing into the interior of the casing is prevented from coming into contact with respect to the sensor, and since it is possible to avoid detecting high pressure gas that has flowed in the sensor, an accurate temperature measurement of the high pressure gas can be performed.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

An in-tank valve 10 is used, for example, in a fuel cell system of a fuel cell vehicle, and is used with the aim of filling hydrogen gas as a high pressure gas into a tank 12, or of supplying (discharging) the hydrogen gas to the fuel cell system from the tank 12. Only the vicinity of an opening 12a of the tank 12 is illustrated in FIG. 1.

Figure 1:
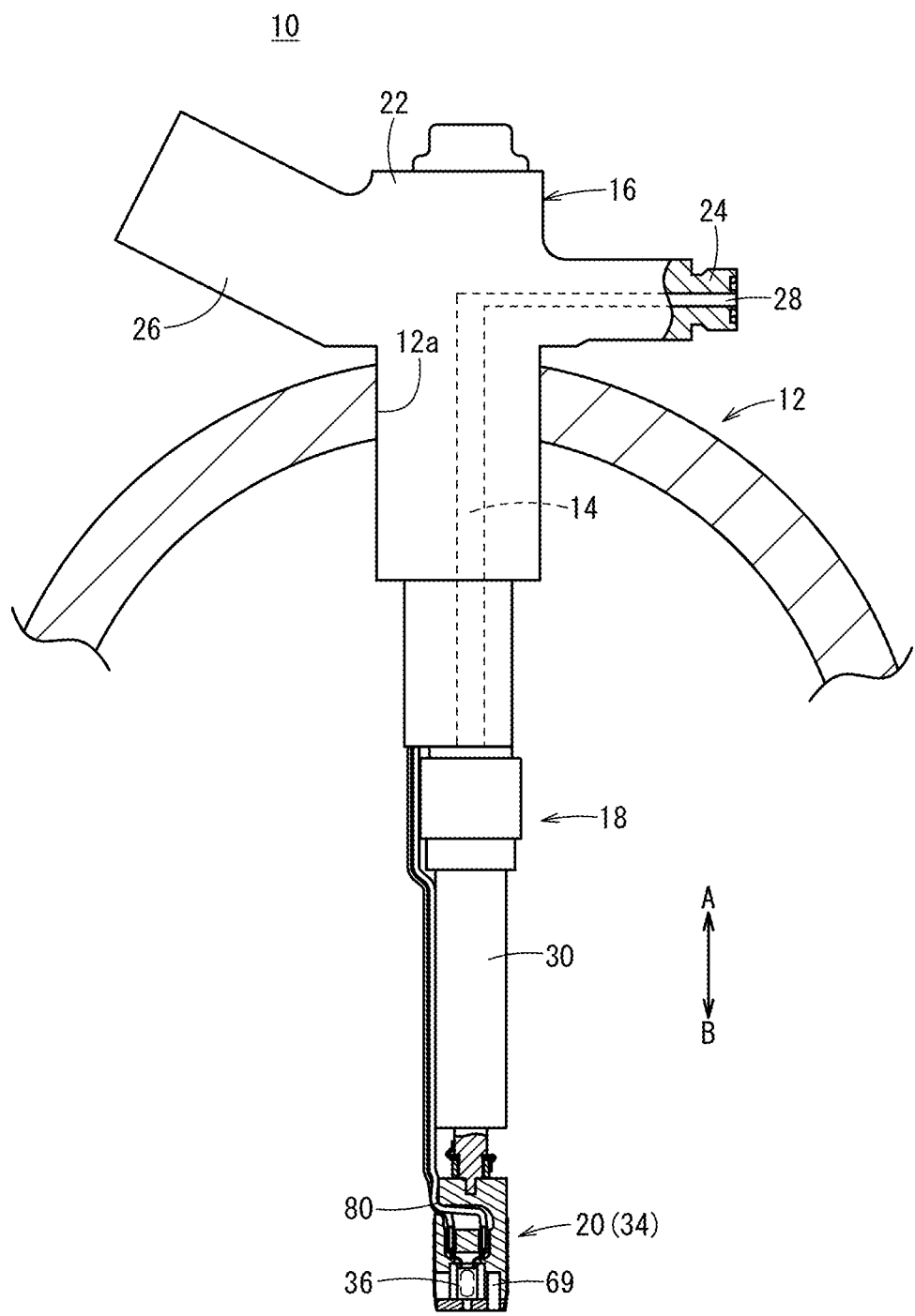
FIG. 1 is a structural diagram partially in cross section showing an in-tank valve according to an embodiment of the present invention, and a portion of a tank in which the in-tank valve is installed.

As shown in FIG. 1, the in-tank valve 10 includes a body 16, which is disposed in the opening 12a that is formed in one end portion of the tank 12, the body 16 having a flow path 14 therein through which hydrogen gas flows into the interior of the tank 12, a drive unit 18 connected to an end of the body 16, and a detector 20 that detects a state of the hydrogen gas in the interior of the tank 12. The tank 12 is made up from a cylindrical body, both ends of which are formed in a substantially hemispherical shape.

The body 16 is formed, for example, from a metal material, and includes a main body portion 22, which is formed in a straight line shape along an axial direction (the directions of arrows A and B) and is mounted in the opening 12a of the tank 12, a piping connector 24 that projects out sideways with respect to the main body portion 22, and a power source connector 26 that projects out in an opposite direction to the piping connector 24. In a state in which the one end thereof projects on an outer side of the tank 12, a substantially central part of the main body portion 22 is fixed by being inserted into the opening 12a of the tank 12. On the other hand, the other end side of the main body portion 22 is accommodated in the interior of the tank 12.

A flow path 14 that extends in the axial direction is formed in the interior of the main body portion 22. One end of the flow path 14 is connected to a connecting flow path 28 that is formed in the piping connector 24, and the other end of the flow path 14 communicates with a housing 30 of the drive unit 18. A non-illustrated hydrogen gas supplying device or a fuel cell system, for example, is connected selectively through piping to the piping connector 24.

A non-illustrated control device and a coupler (not shown), for example, are disposed detachably to the power source connector 26. Lead wires for supplying current to, i.e., energizing, a solenoid unit (not shown) that constitutes the drive unit 18, and lead wires (wiring) 80 for outputting a detection signal detected by the detector 20, are incorporated in the power source connector 26. In addition, by connecting the coupler with respect to the power source connector 26, a control signal from the non-illustrated control device is transmitted to the drive unit 18, and the detection signal detected by the detector 20 is output to the control device.

The drive unit 18 includes in the interior of the cylindrical housing 30 a solenoid unit (not shown) which becomes excited upon being energized, and a communication state of the flow path 14 is switched by opening and closing of a valve body under an exciting action of the solenoid unit.

Figure 2:
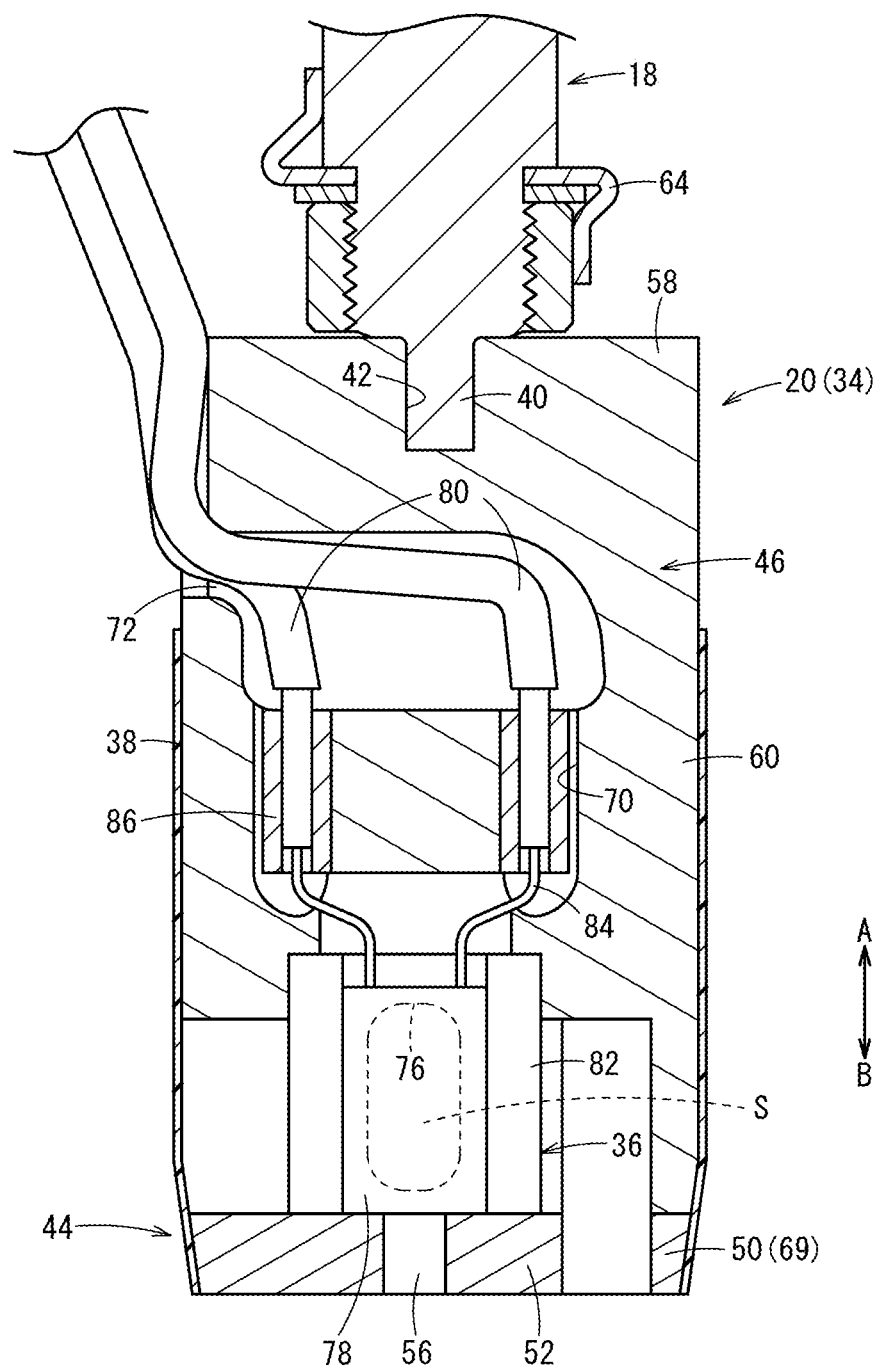
FIG. 2 is an enlarged cross-sectional view showing the vicinity of a detector in the in-tank valve of FIG. 1.

As shown in FIGS. 1 through 4, the detector 20 includes a sensor housing (casing) 34, for example, which is connected to another end of the drive unit 18, a detecting sensor 36 housed in the interior of the sensor housing 34, and a tube 38 that covers the outer circumferential side of the sensor housing 34. As shown in FIG. 2, a locating pin 40, which is formed centrally in the other end of the drive unit 18, is inserted into a center portion of one end of the sensor housing 34. By insertion of the locating pin 40 in a locating hole 42 of the sensor housing 34 when the detector 20 is assembled onto the other end of the drive unit 18, the detector 20 is connected coaxially with the drive unit 18.

As shown in FIGS. 1 through 4, for example, the sensor housing 34 is formed from first and second casings 44, 46. The first casing 44 and the second casing 46 are formed so as to be capable of being divided in two in directions perpendicular to the axial direction of the sensor housing 34 (see FIG. 3).

Figure 3:
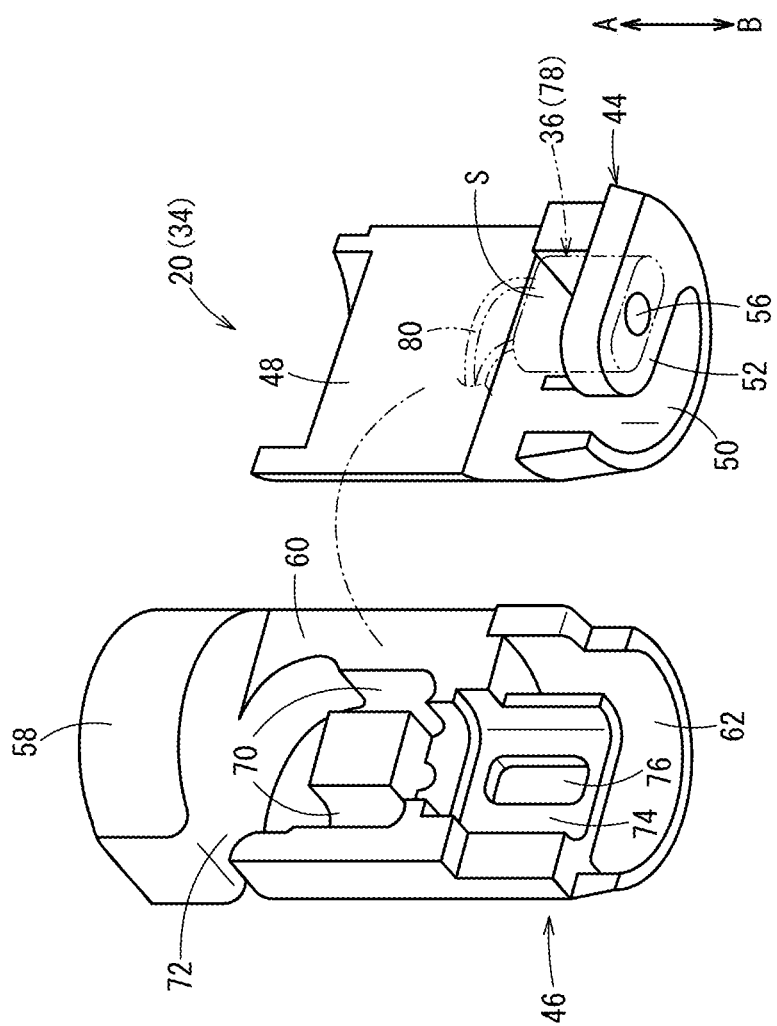
FIG. 3 is an exploded perspective view of the detector shown in FIG. 2.
Figure 4:
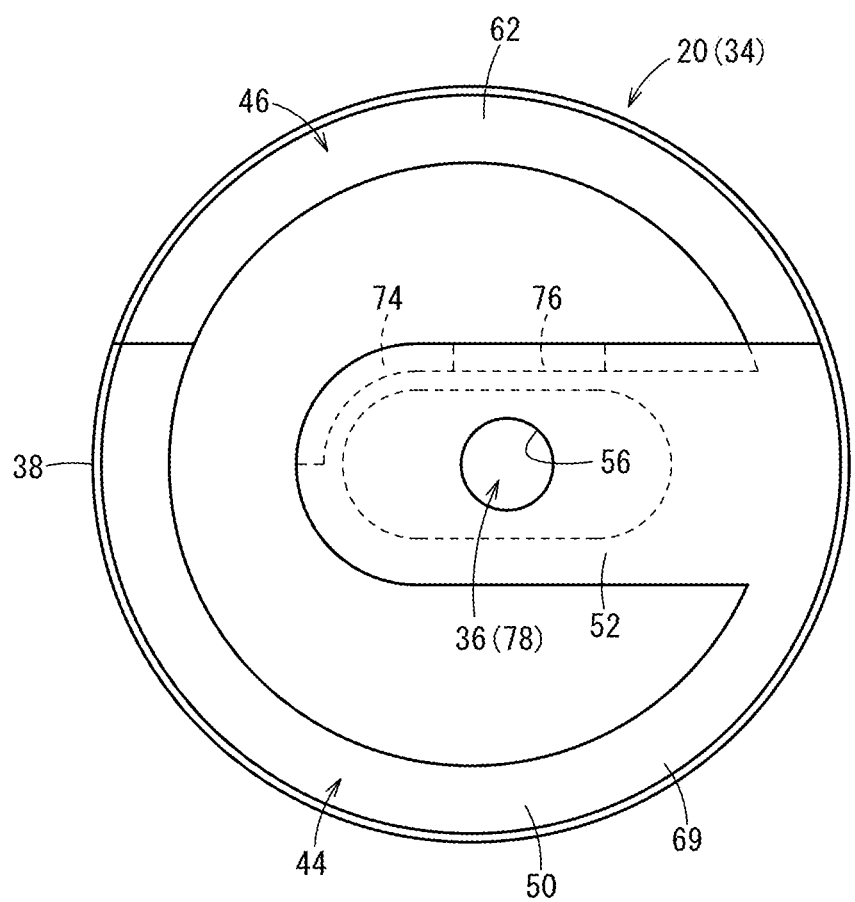
FIG. 4 is a plan view as seen from another end side of the detector shown in FIG. 2.

As shown in FIGS. 2 and 3, the first casing 44 contains a first main body portion 48, which is formed with a semicircular shape in cross section on one end of the sensor housing 34, a first wall 50, which is semicircular in cross section and extends toward the other end side (in the direction of the arrow B) with respect to the first main body portion 48, and a sensor retaining member (fixing member) 52 provided in the interior of the first wall 50. An outer circumferential surface of the first wall 50 in the vicinity of the other end is formed in a tapered shape that gradually reduces in diameter along the other end side (in the direction of the arrow B).

The sensor retaining member 52 projects substantially perpendicularly from an inner wall surface of the first wall 50. One end surface and another end surface thereof are formed in substantially planar shapes. Further, a first communication hole (communication hole) 56 is formed in the sensor retaining member 52 that penetrates in the axial direction (the directions of arrows A and B) of the sensor housing 34. In addition, the sensor retaining member 52 is formed at a position on the other end of the first wall 50, and more specifically, on the other end of the first casing 44 (see FIG. 3).

The second casing 46 contains an attachment part 58 formed in one end of the sensor housing 34 and which is attached to the drive unit 18, a second main body portion 60 formed on the other end side (in the direction of the arrow B) with respect to the attachment part 58, and a second wall 62 that extends further toward the other end side (in the direction of the arrow B) with respect to the second main body portion 60. In the same manner as the first casing 44, an outer circumferential surface of the second wall 62 in the vicinity of the other end is formed in a tapered shape that gradually reduces in diameter along the other end side (in the direction of the arrow B).

The locating hole 42 in which the locating pin 40 is inserted is formed substantially in a center portion of the attachment part 58. In addition, by an attachment jig 64, which is fixed to the other end of the drive unit 18, being engaged with an unillustrated engagement portion of the attachment part 58, the detector 20 is coupled with respect to the other end of the drive unit 18.

When the second casing 46 is assembled with the first casing 44 and thereby constitutes the sensor housing 34, the second main body portion 60 is disposed at a position in abutment (contact) against the first main body portion 48.

In addition, in a condition in which the first main body portion 48 and the second main body portion 60 are in abutment, by engagement of a non-illustrated coupling member, the first casing 44 and the second casing 46 are fixed in a state of being assembled together integrally. The coupling member, for example, may be a retaining ring with a C-shape in cross section, and by an elastic force in a diametral inward direction thereof, the first casing 44 and the second casing 46 are bound and constrained together diametrally. Instead of the retaining ring, for example, a wire material such as a metal wire or the like may be wrapped around the first casing 44 and the second casing 46 to thereby assemble them together.

More specifically, concerning the sensor housing 34, a condition is brought about in which the first main body portion 48 and the second main body portion 60 are combined, and the first wall 50 and the second wall 62 also are combined, such that a cylindrical sensor accommodating section 69 is constituted from the first and second walls 50, 62. Further, the other end side of the sensor housing 34 is formed with a tapered shape, the outer circumferential surface of which is gradually reduced in diameter.

In the interior of the sensor accommodating section 69, as shown in FIGS. 2 and 3, a sensor space S is included, which is surrounded by the sensor retaining member 52 and a guide wall 74, and in which the detecting sensor 36 is accommodated.

On the other hand, in the interior of the second main body portion 60, a pair of retaining grooves 70 is formed in which the lead wires 80 of the detecting sensor 36 are retained, and a wiring port 72 opens toward one end side on the side of the attachment part 58. The retaining grooves 70, for example, with semicircular shapes in cross section, extend for a predetermined length in the axial direction (the directions of arrows A and B), and are disposed substantially in parallel with each other.

The wiring port 72 is formed in the vicinity of the attachment part 58 on the second main body portion 60, and by opening toward the outer circumferential side of the second main body portion 60, enables communication between the interior and the exterior of the second main body portion 60. Stated otherwise, the wiring port 72 opens in a direction substantially perpendicular to the direction in which the retaining grooves 70 extend. The wiring port 72 is not limited to the case of opening in a substantially perpendicular direction, and for example, may be formed so as to open in an upwardly inclined direction or a downwardly inclined direction at a predetermined angle of inclination with respect to the axial direction of the second main body portion 60.

In the interior of the second wall 62, there is formed the guide wall (fixing member) 74, which is erected in the direction of extension of the second wall 62 (the direction of the arrow B) from the other end of the second main body portion 60. The guide wall 74 is formed with a predetermined height at a position on the one end of the sensor retaining member 52, and substantially in the center thereof, an oblong substantially elliptical shaped second communication hole (communication hole) 76 is formed along the vertical direction. In addition, in a state in which the first casing 44 and the second casing 46 are combined, the guide wall 74 is disposed in abutment against one end surface of the sensor retaining member 52.

The detecting sensor 36, for example, includes a sensor 78 having as a detecting element a resistance temperature detector, a thermocouple, or a thermistor, and the lead wires 80 are connected to one end of the sensor 78. The sensor 78 is accommodated in the interior of a cover member 82, which is elliptically shaped in cross section and made from a metal material (see FIG. 2).

In addition, by outputting a resistance value, which changes depending on the temperature of the hydrogen gas, as an electrical signal from the sensor 78 through the lead wires 80 to a non-illustrated control device, the temperature is calculated based on the electrical signal.

One end of the sensor 78 equipped with the detecting element is arranged along the axial direction (the directions of arrows A and B) in facing relation to the first communication hole 56 of the sensor retaining member 52, and a side surface thereof is arranged in facing relation to the second communication hole 76 of the guide wall 74.

Conductive wires 84 that are taken out from the other end of the sensor 78 are joined with and inserted into the retaining grooves 70 as the lead wires 80, and are retained by terminals 86 that are disposed inside the retaining grooves 70. Together therewith, after being retained in the retaining grooves 70, the lead wires 80 are guided to the wiring port 72 in a bending manner, and are led out to the exterior of the sensor housing 34 from the wiring port 72. In addition, after extending to the outside of the drive unit 18 and the body 16, the lead wires 80 are incorporated in the power source connector 26.

The tube 38, for example, is a heat shrinkable tube formed from a resin material, which in a state of being inserted over the outer circumferential side of the sensor housing 34, is shrunk by heating to thereby cover a portion of the sensor housing 34. Owing thereto, the tube 38 couples together and constrains the divided structure of the first casing 44 and the second casing 46.

In addition, as shown in FIG. 1, after the lead wires 80 are bent and taken out to the exterior from the wiring port 72 of the sensor housing 34, the lead wires 80 extend in the axial direction (in the direction of the arrow A) along the side of the drive unit 18. Further, one end portion of the tube 38 may be constituted so as to cover the wiring port 72 and a portion of the lead wires 80 that are taken out to the exterior from the wiring port 72.

The in-tank valve 10 according to the embodiment of the present invention is constructed basically as described above. Next, operations and advantages of the in-tank valve 10 will be described.

At first, a description will be given concerning a case in which hydrogen gas from the non-illustrated hydrogen gas supplying device is filled in the tank 12. The hydrogen gas supplying device (not shown) is connected beforehand to the piping connector 24 of the body 16.

When hydrogen gas from the non-illustrated hydrogen gas supplying device is supplied to the connecting flow path 28 of the piping connector 24, a check valve (not shown) disposed in the connecting flow path 28 is opened automatically by the pressure of the hydrogen gas, thus resulting in a valve-open state.

In addition, after the hydrogen gas has flowed from the connecting flow path 28 into the flow path 14, the hydrogen gas passes through the interior of the drive unit 18, whereupon the hydrogen gas is supplied into and fills the tank 12.

Further, at this time, the hydrogen gas introduced to the interior of the tank 12 passes through the first communication hole 56 in the detector 20 and comes into contact with the sensor 78, whereby the flowing hydrogen gas is not blown against the sensor 78, and the temperature of the hydrogen gas is detected with greater accuracy. The temperature detected by the sensor 78 is output as a detection signal to the power source connector 26 through the lead wires 80, and by being output to a non-illustrated control device via the coupler, an accurate temperature of the hydrogen gas is calculated based on the electrical signal.

Furthermore, by being placed in contact with the hydrogen gas through the second communication hole 76, which opens toward the outer circumferential surface thereof, the sensor 78 and the cover member 82 can suitably be adjusted in temperature to the same temperature as the hydrogen gas. Stated otherwise, the heat of the sensor 78 and the cover member 82, which are heated by the hydrogen gas, is suitably dissipated and cooled through the second communication hole 76.

More specifically, when the sensor 78 and the cover member 82 are heated by the hydrogen gas which has become high in temperature, by the cover member 82 retaining heat regardless of whether the temperature of the hydrogen gas has decreased, there is a concern that a temperature which is higher than the actual temperature may be detected.

Even in such a case, by the cover member 82 in which the sensor 78 is included suitably dissipating heat through the second communication hole 76, which opens largely facing toward the outer circumferential surface of the cover member 82, the cover member 82 is prevented from maintaining a temperature state higher than that of the hydrogen gas, and an accurate temperature measurement can always be performed by the sensor 78.

Next, a description will be made concerning supply of the hydrogen gas, which has been stored in the tank 12 in the foregoing manner, to a fuel cell system. In this case, the piping connector 24 is connected beforehand through non-illustrated piping to the fuel cell system.

At first, by transmission of a signal to the drive unit 18 from a non-illustrated control device, a valve body (not shown) is operated, and a state of communication is established between the interior of the tank 12 and the flow path 14.

In addition, after hydrogen gas inside the tank 12 has flowed into the interior of the housing 30 of the drive unit 18, the hydrogen gas is supplied to a fuel cell system (not shown) that is connected to the piping connector 24 through the flow path 14 and the connecting flow path 28 of the body 16.

In this case as well, by the detecting sensor 36 of the detector 20, the temperature of the hydrogen gas is detected through the first communication hole 56, and by outputting the detection signal to the non-illustrated control device through the lead wires 80 and the coupler, an accurate temperature of the hydrogen gas is calculated without the flowing hydrogen gas contacting the detecting sensor 36.

Moreover, although the aforementioned sensor housing 34 is constructed so as to allow the first casing 44 and the second casing 46 to be completely divided, the invention is not limited to this feature, and for example, may be constituted with a hinge structure by which an end of the first casing 44 in the axial direction and an end of the second casing 46 in the axial direction are joined, so that the first casing 44 and the second casing 46 are capable of opening and closing.

Further, the high pressure gas, which is used for filling the tank 12 through the in-tank valve 10, or which is discharged from the tank 12, is not limited to hydrogen gas.

As described above, according to the present embodiment, in the detector 20 that constitutes the in-tank valve 10, since the lead wires 80 that are connected to the sensor 78 are taken out to the exterior in a bending fashion through the wiring port 72 that opens on one end of the sensor housing 34, the flowing hydrogen gas in the interior of the tank 12 is prevented from entering into the sensor space S from the wiring port 72 and coming into contact with the sensor 78. As a result, it is possible to avoid detecting flowing hydrogen gas by the sensor 78 of the detecting sensor 36, and by detecting the temperature of hydrogen gas that is not flowing, an accurate temperature measurement of the hydrogen gas can be performed.

Further, the plural lead wires 80 are led out to the exterior through the wiring port 72 of the sensor housing 34, whereby it is possible for the wiring port 72 to be suitably closed and blocked, and along therewith, flowing hydrogen gas in the interior of the tank 12 is prevented from entering into the sensor space S through the wiring port 72. As a result, the temperature of hydrogen gas that is not flowing in the interior of the sensor housing 34 can be detected accurately by the detecting sensor 36.

Furthermore, compared to a case of arranging the detecting sensor 36 on the other end side (in the direction of the arrow B) of the sensor retaining member 52 outside of the sensor space S, by carrying out detection through the first communication hole 56, since it is possible to measure the ambient temperature of non-flowing hydrogen gas, a more accurate temperature measurement can be realized.

Further still, by forming the first communication hole 56 in facing relation to an end in the axial direction of the sensor 78, it becomes possible to detect hydrogen gas that is led to the end of the sensor 78 in the axial direction through the first communication hole 56, and therefore, by detecting the temperature of hydrogen gas that is not flowing at the interior of the first communication hole 56, a more accurate temperature measurement can be performed.

Still further, by forming the second communication hole 76 so as to face toward an outer circumferential side substantially perpendicular to the axis of the sensor 78, the sensor 78, which has been heated by the hydrogen gas, is capable of dissipating heat through the second communication hole 76. Therefore, the temperature of the sensor 78 which has once been heated is prevented from remaining high compared to the hydrogen gas, and the temperature of the hydrogen gas itself can be measured more accurately by the sensor 78.

Furthermore, because the vicinity of the wiring port 72 of the sensor housing 34 is covered together with the lead wires 80 by the tube 38 that covers the outer circumferential side of the sensor housing 34, entry of hydrogen gas into the interior through the wiring port 72 can more reliably be prevented.

The in-tank valve according to the present invention is not limited to the embodiment described above, and it goes without saying that various alternative or additional structures may be adopted therein without deviating from the essential gist of the present invention.

What is claimed is:

1. An in-tank valve disposed in a tank in which a high pressure gas is stored in interior thereof, and including in the interior of the tank a detector configured to detect a temperature of the high pressure gas, the detector comprising:
   a sensor configured to detect the temperature;
   wiring connected to the sensor; and
   a casing including a fixing member configured to fix the sensor in interior of the casing, at least part of the wiring being accommodated in the casing;
   wherein an outer circumferential surface of the casing includes a wiring port through which the wiring is taken out to exterior of the casing, and a flat portion extending along an axial direction of the casing and positioned on an inner side of an outermost circumferential surface of the casing,
   the wiring port opens in a direction that is inclined with respect to the axial direction of the casing, and the wiring port is defined by chamfered walls.

2. An in-tank valve disposed in a tank in which a high pressure gas is stored in interior thereof, and including a detector configured to detect a temperature of the high pressure gas, the detector comprising:
   a sensor configured to detect the temperature;
   wiring connected to the sensor;
   a casing including a fixing member configured to fix the sensor in interior of the casing, at least part of the wiring being accommodated in the casing; and
   a flat portion extending along an axial direction of the casing,
   wherein the flat portion is positioned on an inner side of an outermost circumferential surface of the casing,
   the casing includes a wiring port defined by chamfered walls,
   an interior space of the casing includes a sensor space section in which the sensor is arranged, the sensor space section being defined by the fixing member; and
   the fixing member comprises at least one communication hole configured to allow communication between the sensor space section and the interior of the tank.

3. The in-tank valve according to claim 2, wherein the communication hole is arranged in facing relation to one end of the sensor including a measuring unit in the axial direction of the casing.

4. The in-tank valve according to claim 2, wherein the communication hole is arranged in facing relation to a side wall that is substantially perpendicular to the axial direction of the casing.

* * * * *